Figure 1:
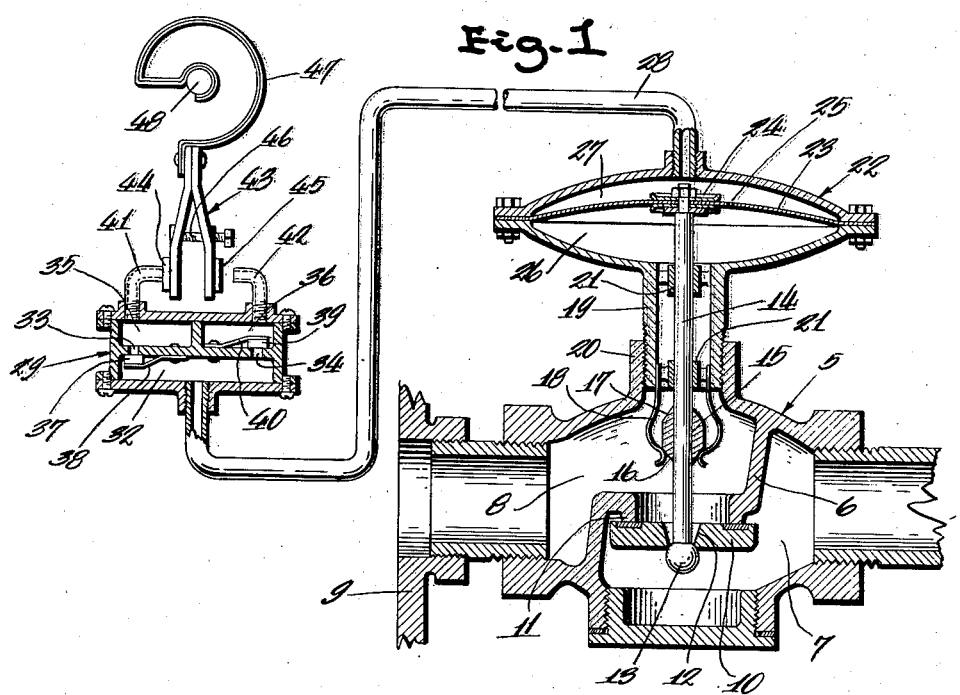

April 25, 1939.　　　　　S. MAYNER　　　　　2,155,796

VALVE CONTROL MECHANISM

Filed April 9, 1935

Stanley Mayner
INVENTOR

BY Freeman, Sweet, Albrecht & Weidman
ATTORNEYS

Patented Apr. 25, 1939

2,155,796

UNITED STATES PATENT OFFICE 2,155,796

VALVE CONTROL MECHANISM

Stanley Mayner, Cleveland, Ohio

Application April 9, 1935, Serial No. 15,449

8 Claims. (Cl. 236—40)

This invention relates to valve control mechanism for radiators, and the like, and has for an object the provision of control mechanism, wherein vacuous and pressure conditions are set up therein, and thermostatically controlled to effect predetermined movements of the valve means.

Figure 2:
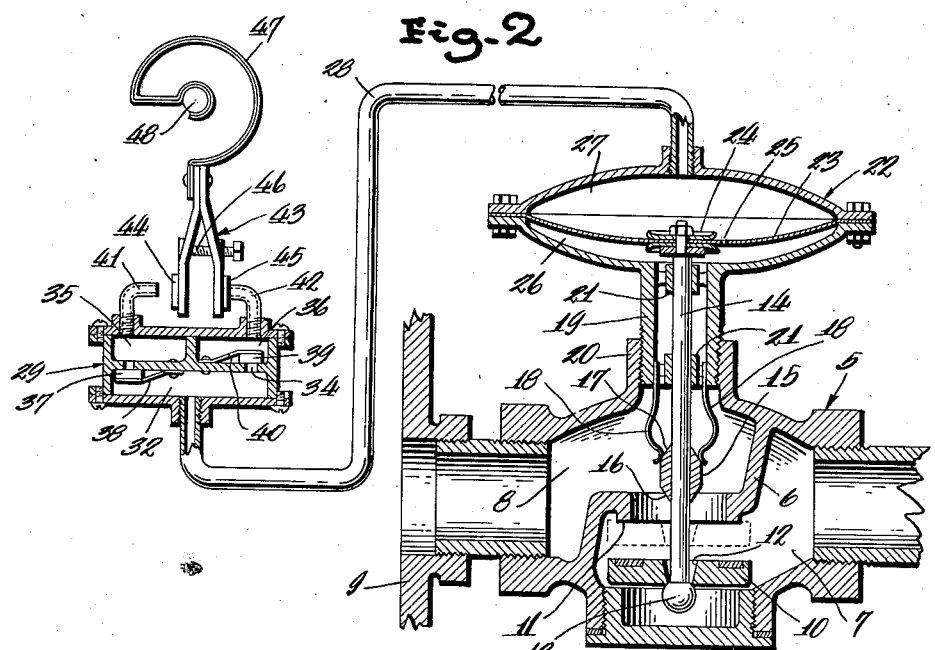

In the drawing accompanying this specification and forming part of this application, I have shown, for purposes of illustration one embodiment which my invention may assume, and in the drawing:

Figure 1 is a vertical sectional view of an embodiment of the invention, showing parts of mechanism in one position of operation, while Figure 2 is a similar view showing the mechanism in another position of operation.

As shown in the drawing, the invention comprises a valve casing 5, having an apertured partition 6, dividing the casing 5 into an inlet chamber 7 and an outlet chamber 8, the outlet chamber 8 being adapted to be connected with a steam radiator, a fragment of which is indicated at 9 in the drawing.

Arranged within the inlet chamber 7 is a main valve 10, having a countersunk washer adapted to engage the apertured valve seat 11. The main valve 10 may be of any suitable material, and is provided with a tapered opening 12, formed to provide a valve seat for a ball valve 13, which is carried by a valve stem 14. The valve stem 14 intermediate its ends is provided with a cam member 15 having lower and upper cam surfaces 16 and 17, adapted to cooperate with spaced leaf springs 18, the springs 18 each having a curved end portion for better sliding contact with the cam surfaces of the cam member 15, the opposite ends of the springs 18 being secured, by any suitable means, to the interior of a tubular fitting 19, screw-threaded into a boss 20 at the top of the valve casing 5.

The tubular fitting 19 is provided with spaced, centrally disposed bearings 21 for reciprocably supporting the valve stem 14, and the tubular member 19 carries, and communicates with, a diaphragm supporting casing 22 of ordinary construction, a diaphragm 23 being mounted centrally in the casing 22 and being secured to the upper end of the valve stem 14 by any well known securing means, as indicated at 24, so that movement of the diaphragm 23 imparts corresponding movement to the valve stem 14. The diaphragm 23 is provided with a minute opening 25, adapted to equalize pressure between the chamber 26 below the diaphragm 23 and the chamber 27 above said diaphragm.

The diaphragm chamber 27 communicates through a pipe 28 with a control mechanism indicated generally by the reference character 29. The control mechanism 29 comprises a chamber 32, with which the pipe 28 directly communicates, and the chamber 32 communicates through valve openings 33 and 34 respectively with chambers 35 and 36, a valve 37 being mounted in the chamber 32, and normally urged by a leaf spring 38 to close the opening 33, a similar valve 39 being mounted in the chamber 36, and normally urged by a leaf spring 40 to close the opening 34, the valve 39 being movable in a direction opposite to the valve 37.

The chamber 35 of the control mechanism communicates with a bent pipe duct 41, while the chamber 36 communicates with a bent pipe duct 42 disposed in an opposite direction, these pipe ducts 41 and 42 being adapted to be alternately opened and closed through the operation of a valve device 43, which has a valve member 44 cooperatable with the pipe duct 41, and a valve member 45 cooperatable with the pipe duct 42, the spacing and movement of the valves 44 and 45 being adjustably regulable through the medium of a set screw 46. The valve device 43 is secured to one end of a bimetallic thermostatic element 47, the opposite end of said element being secured by any suitable means to a stationary post 48, the element 47 being operable to cause the valves 44—45 to maintain one or the other of the ducts 41 and 42 closed at all times except during movement of the valves 44—45 from one closing position to the other.

In operation, and assuming the radiator 9 to be cut off from the steam supply, the main valve 10 closed, and the pipe duct 41 closed by the valve 44, the pressure on the two sides of the diaphragm 23 will be equalized due to the presence of the opening 25 therein, and the pressure throughout the mechanism will be substantially reduced because cooling of the radiator 9 and the passage of steam therefrom, brings about a partial vacuum in the radiator 9 and in the valve casing 5, this reduction in pressure also occurring in the chamber 35, due to the fact that the valve 37 will yield to permit such reduction.

When the thermostatic device 47 operates by lowering of temperature to move the valve 44 to the right, as viewed in Figure 1, and open the pipe duct 41, atmospheric air rushes into the chamber 35, and the valve 37 yielding, such air enters the diaphragm chamber 27, via the pipe 28, and causes the diaphragm 23 to drop, and to open the ball valve 13, whereupon steam passes through the valve aperture 12 and into the radiator 9, and as the steam pressure builds up in the radiator 9, such pressure will allow the main valve 10 to drop, fully opening the same, and under this higher pressure condition, the pressure will be equalized by the opening 25 in the diaphragm 23 at the two sides of the diaphragm, and in the chamber 36. When the temperature of the compartment in which the thermostatic device 47 is placed rises sufficiently, the valve device 45 is moved by the thermostatic device 47, to the left, as viewed in Figure 2, to open the pipe duct 42, and the rapid drop in pressure in the chamber 36, transmitted also to the upper side of the diaphragm 23, causes the diaphragm 23 to move upwardly and to close both the main valve 10 and the ball valve 13, cutting off steam to the radiator, and the mechanism is then in condition for another cycle of operation, the cam member 15 and leaf springs 18 preventing fluttering of the diaphragm 23.

It will be apparent from the above described arrangement that relatively small actuating forces are necessary to operate the valve mechanism, since when the ball valve 13 is opened, the increasing pressure of the entering steam unseats the main valve 10, and when the main valve 10 is closed, it is closed at a time when the steam pressure is equalized at opposite sides of the main valve 10.

It will be apparent to those skilled in the art that I have accomplished at least the principal object of my invention; it will also be apparent to those skilled in the art that the embodiment herein shown may be variously changed and modified without departing from the spirit of the invention. Hence it will be appreciated that the embodiment herein described is illustrative only, and that my invention is not limited thereto.

I claim:

1. Apparatus of the character described, comprising: means for supplying fluid at a pressure in excess of atmospheric pressure; means to which said fluid is adapted to be supplied, said means when not supplied with said fluid exhibiting a pressure below atmospheric pressure; valve means controlling supply of fluid to the means to be supplied; actuating mechanism for said valve means responsive both to said above and below atmospheric pressure depending upon the position of said valve means, said actuating mechanism having provision for equalizing pressure thereon; and means for changing the equalized pressure affecting said actuating mechanism at a rate faster than the pressure can be equalized by said equalizing provision to effect a valve means actuating movement of said actuating mechanism.

2. A device of the character described, comprising: a chamber, in one phase of operation exhibiting a lower than atmospheric pressure and in another phase of operation being communicable with fluid at a higher pressure; valve mechanism for controlling admission of said fluid to said chamber; and pressure responsive means communicable with said chamber and with atmospheric air, said means adapted when closed to the atmosphere to participate in a drop in pressure in said chamber without movement, and when opened to atmospheric air influenced thereby to operate said valve mechanism in an opening direction, said pressure responsive means adapted to communicate with said higher pressure fluid, when the valve mechanism is opened and adapted to trap some of said fluid, and in another position to release said fluid and effect a movement of said valve mechanism in a closing direction.

3. A device of the character described, comprising: a steam radiator, normally exhibiting a lower than atmospheric pressure when not supplied with steam; valve mechanism for controlling the supply of steam to said radiator; and pressure responsive means communicable with said radiator and with atmospheric air, said means adapted when closed to atmosphere to participate in a drop in pressure in said radiator without movement, and when opened to atmospheric air influenced thereby to operate said valve mechanism in an opening direction, said pressure responsive means adapted to communicate with the steam pressure, when the valve mechanism is opened and adapted to trap some of said steam, and in a second position to release said steam and effect a movement of said valve mechanism in a closing direction.

4. A device of the character described, comprising: a chamber, in one phase of operation exhibiting a lower than atmospheric pressure and in another phase of operation being communicable with fluid at a higher pressure; valve mechanism for controlling admission of said fluid to said chamber; pressure responsive means communicable with said chamber and with atmospheric air, said means adapted when closed to the atmosphere to participate in a drop in pressure in said chamber without movement, and when opened to atmospheric air influenced thereby to operate said valve mechanism in an opening direction, said pressure repsonsive means adapted to communicate with said higher pressure fluid, when the valve mechanism is opened and adapted to trap some of said fluid, and in another position to release said fluid and effect a movement of said valve mechanism in a closing direction; and temperature responsive means for controlling the operation of said pressure responsive means.

5. A device of the character described, comprising: a steam radiator, normally exhibiting a lower than atmospheric pressure when not supplied with steam; means for supplying steam to said radiator; valve mechanism for controlling said steam supply; a diaphragm containing chamber, having a diaphragm therein, connected to said valve mechanism, said chamber at one side of said diaphragm being communicable with the interior of said radiator, and said diaphragm having a bleed hole therein effective to equalize the lower than atmospheric pressure at both sides of said diaphragm when said radiator is not supplied with steam; and actuating means communicable with said diaphragm chamber at the opposite side of said diaphragm, in one position closed to atmospheric air, and participating in the drop in pressure in said radiator, and in another position openable to atmospheric air to influence said diaphragm and move said valve mechanism.

6. A device of the character described, comprising: a steam radiator, normally exhibiting a lower than atmospheric pressure when not supplied with steam; means for supplying steam to said radiator; valve mechanism for controlling said steam supply; a diaphragm containing chamber, having a diaphragm therein connected to said valve mechanism, said chamber at one side of said diaphragm being communicable with the interior of said radiator, and said diaphragm having a bleed hole therein effective to equalize pressure at both sides of said diaphragm; actuating means communicable with said diaphragm chamber at the opposite side thereof, in one position closed to atmospheric air and participating in the drop in pressure in said radiator, and in another position openable to atmospheric air to influence said diaphragm and move said valve mechanism in one direction; and additional actuating means, commuicable with said diaphragm chamber at said opposite side, and subject to steam pressure when said valve mechanism is open, said actuating means, in one position being closed to atmospheric air, and in another position open to atmospheric air to vent steam therefrom and effect movement of said valve mechanism in an opposite direction.

7. A device of the character described, comprising: a steam radiator, normally exhibiting a lower than atmospheric pressure when not supplied with steam; means for supplying steam to said radiator; valve mechanism for controlling said steam supply; a diaphragm containing chamber, having a diaphragm therein connected to said valve mechanism, said chamber at one side of said diaphragm being communicable with the interior of said radiator, and said diaphragm having a bleed hole therein effective to equalize pressure at both sides of said diaphragm; actuating means communicable with said diaphragm chamber at the opposite side thereof, in one position closed to atmospheric air and participating in the drop in pressure in said radiator, and in another position openable to atmospheric air to influence said diaphragm and move said valve mechanism in one direction; additional actuating means, communicable with said diaphragm chamber at said opposite side, and subject to steam pressure when said valve mechanism is open, said actuating means, in one position being closed to atmospheric air, and in another position open to atmospheric air to vent steam therefrom and effect movement of said valve mechanism in an opposite direction; and temperature responsive means for controlling said actuating means.

8. Apparatus of the character described, comprising: diaphragm-actuated valve means; mechanism for setting up a vacuous condition simultaneously at both sides of said diaphragm, in one phase of operation, and for setting up a pressure condition simultaneously at both sides of said diaphragm, during another phase of operation; and means constructed and arranged to increase pressure at one side of said diaphragm during the first phase of operation to effect movement of said valve means in one direction, and for relieving pressure at one side of said diaphragm during the second phase of operation, to effect movement of said valve means in an opposite direction.

STANLEY MAYNER.